2 Sheets—Sheet 1.

G. W. GREENWOOD.
SEWER-TRAP.

No. 186,832. Patented Jan. 30, 1877.

WITNESSES
Jno. A. Skinkle
J. Stith

INVENTOR,
George W. Greenwood
By his Attorneys.
Baldwin, Hopkins & Peyton

N. PETERS, PHOTO-LITHOGRAPHER, WASHINGTON, D. C.

2 Sheets—Sheet 2.

G. W. GREENWOOD.
SEWER-TRAP.

No. 186,832. Patented Jan. 30, 1877.

WITNESSES

INVENTOR
George W. Greenwood
By his Attorneys

UNITED STATES PATENT OFFICE.

GEORGE W. GREENWOOD, OF COLUMBUS, OHIO.

IMPROVEMENT IN SEWER-TRAPS.

Specification forming part of Letters Patent No. 186,832, dated January 30, 1877; application filed November 1, 1876.

*To all whom it may concern:*

Be it known that I, GEORGE W. GREENWOOD, of Columbus, in the county of Franklin and State of Ohio, have invented certain new and useful Improvements in Sewer-Traps, of which the following is a specification:

My invention relates to sewer-traps of that class which automatically open and close. Its objects are to hold the trap closed until a certain weight of sewage has accumulated within it; then to cause it to open widely, and suddenly to discharge its entire contents, and then to close quickly, and remain securely sealed when closed.

To these ends my improvements consist, first, in pivoting the saucer or door of the trap, so as to rock freely upon a lever hinged at one side of the trap, and acted upon a weighted lever, which holds the trap locked until overborne by the weight of the sewage, when it releases the saucer to permit the trap to open suddenly and closes it again when emptied. This form of trap is especially adapted for large sewers.

The object of the next part of my invention is to adapt the trap more especially for house use, and to combine the advantages of a tight metal joint with a water-joint on both sides thereof, to prevent the backward flow of gas into the house, to which ends my improvement consists in combining a saucer pivoted upon a hinged lever, as described, with a deep flange surrounding the bottom of the waste-pipe, against the end of which the saucer abuts, in such manner as to leave an annular water-joint around the pipe in addition to the usual seal within the pipe.

The subject-matter claimed will hereinafter specifically be designated.

Figure 1:
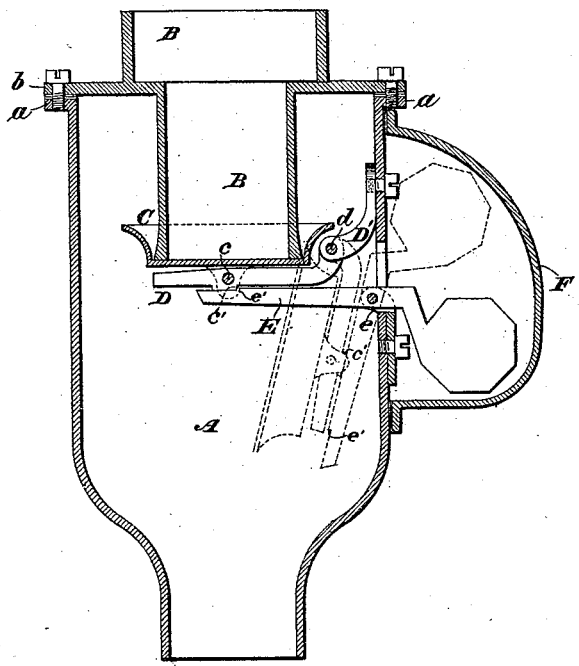
Figure 2:
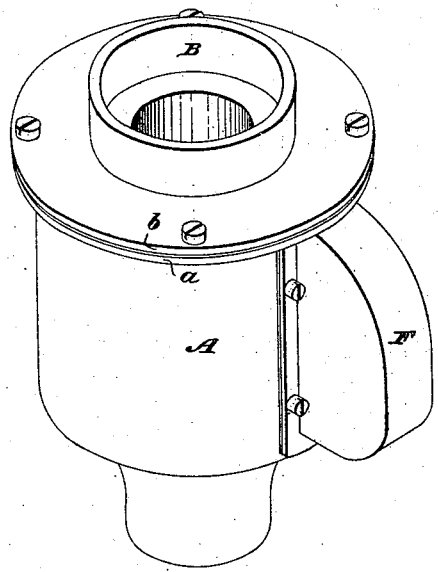
Figure 3:
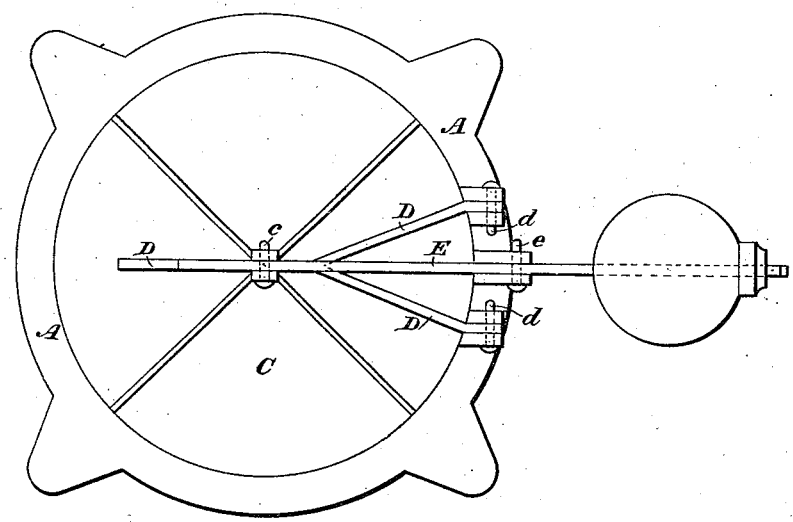

In the accompanying drawings, which show my improvements as embodied in the best way now known to me, Figure 1 represents a vertical central section through a house-trap and its casing, the trap being shown in full lines as closed, and in dotted lines as open; and Fig. 2 represents a view, in perspective, of the trap above mentioned. Fig. 3 represents an inverted plan view; and Fig. 4, a vertical section through a large sewer-trap, likewise shown as closed in full lines, and as open in dotted lines.

For house-traps the bowl A is preferably cast of metal in a single piece, with a flange, $a$, extending around its upper edge, upon which rests and is secured a supporting-flange, $b$, of a waste-pipe, B. A strip of india-rubber or other suitable packing may be interposed between the two flanges, to insure a tight joint. The end of the waste-pipe projects a short distance into the casing of the trap, as shown in Fig. 1. A saucer, C, mounted upon a hinged lever, D, by means of a pivot, $c$, fits snugly against, and closes the end of, the waste-pipe. This lever is hinged at $d$ to an arm, D', secured to the side of the trap-casing, or to suitable lugs cast thereon.

The saucer or cup, it will be observed, is capable of rocking freely upon its pivot-pin, to accommodate itself to the waste-pipe, and the lever upon which it is mounted is capable of swinging down into a vertical position, so as to permit the trap to be widely opened.

The trap is held in a closed position by means of a pivoted weighted lever, E, one end of which bears against the under side of the supporting-lever D. This weighted lever is shown as pivoted to lugs $e$ on the casing, and is similar to the weighted levers usually employed, except that it is provided with a locking-shoulder, $e'$, or its equivalent, which engages with a similar shoulder, $c'$, on the swinging lever D, the result of which is that, as the radius of the two levers is different, a lock is formed, the object of which is to increase the resistance to the opening of the trap, and keep it tightly closed until the sewage accumulated therein is sufficient to overcome the combined resistance of both lock and weight.

As the trap begins the opening movement under the pressure of the accumulated matter therein, the locking-shoulder is disengaged, and the pressure then becomes overwhelming as against the resistance offered by the weighted lever alone, and the trap is thrown quickly and widely open to permit of the free escape of the entire mass of sewage, and is then quickly closed by the weighted lever, in a well-known way.

It will thus be seen that by my improvements the opening of the trap is prevented up to a certain point, when it opens quickly to allow its contents to be discharged. It is then rapidly closed by the weighted lever and locked in its closed position, so as to afford little or no opportunity for the escape of foul air or gas.

The saucer, by being pivoted, readily accommodates itself to any wear or inequality in the pipe, and in addition thereto constitutes a triple joint—that is, a close metal joint and a water-joint on each side thereof—as will be understood by an inspection of Figs. 1 and 2 of the drawings, which construction is very advantageous.

The mechanism for automatically closing the trap is protected by a hood or cover, F, a packing being interposed between it and the casing to which it is secured, to insure a tight joint, and prevent leakage of gas or water.

I have described the waste-pipe as extending into the trap-casing to form the seat for the saucer or cup; but it is obvious that this pipe may be cast with, and form a portion of, the casing, and the waste-pipe be connected therewith.

Figure 4:
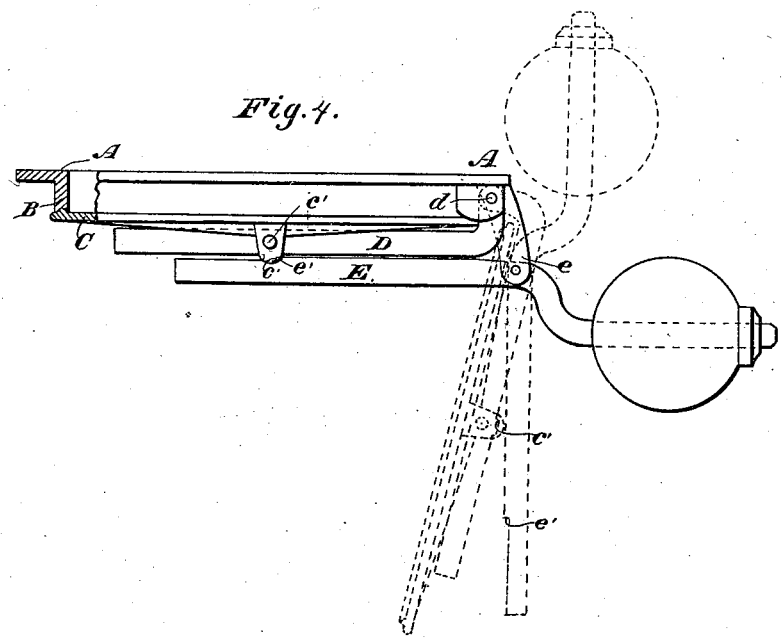

For large sewer-traps I prefer the construction shown in Figs. 3 and 4. The bowl A is provided with an annular horizontal flange having suitable lugs, which may rest upon the masonry of the man-hole, in the usual way, and the saucer or door is made with a flat or slightly-dished bottom, having a slight ridge around its edge, which fits into a corresponding groove in the bottom of the waste-pipe B, which, in this instance, consists of a shallow flange depending below the bowl.

The masonry of the sewer-inlet may also, if preferred, rest upon the flange of the bowl, and be built up to any suitable height. The lever D is, for greater strength, bifurcated, and pivoted directly to lugs depending from the bowl A. A positive lock is also not so essential in this class of large traps. Except in these details, the construction and operation of the trap are the same as that before described.

I claim as of my own invention—

1. The combination, substantially as hereinbefore set forth, of the water-pipe, the saucer or door, adapted to abut against the end of the pipe, a hinged vertically swinging lever, upon which the saucer or door is pivoted, and an independent weighted lever, which tends to hold the saucer in its elevated position.

2. The combination, substantially as hereinbefore set forth, of the waste-pipe, the saucer, the vertically-swinging hinged lever, upon which the saucer is pivoted, the independent weighted lever, swinging on a longer radius than the saucer-lever, and a lock which holds the trap closed until the lock is released and then opens suddenly and widely to insure the entire discharge of its contents, as described.

3. The improved sewer-trap, hereinbefore described, consisting of the combination of the casing, a waste-pipe of smaller diameter projecting therein, a rocking saucer or cup abutting against the end of said pipe, and pivoted on a vertically-swinging lever, an independent swinging weighted lever of longer radius than the saucer-lever, and a lock to hold the saucer in its closed position.

In testimony whereof I have hereunto subscribed my name.

GEORGE W. GREENWOOD.

Witnesses:
ALLEN W. THURMAN,
E. L. TAYLOR.